United States Patent
Wozich et al.

(10) Patent No.: US 12,549,441 B2
(45) Date of Patent: Feb. 10, 2026

(54) SYSTEMS AND METHODS FOR QUANTIFYING A NETWORK CHANGE GENERATED BY AUTOMATED NETWORK EVENTS

(71) Applicant: Verizon Patent and Licensing Inc., Basking Ridge, NJ (US)

(72) Inventors: Zachary Wozich, Casco, ME (US); Vaughne Glymph, Pittsburgh, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 167 days.

(21) Appl. No.: 18/604,736

(22) Filed: Mar. 14, 2024

(65) Prior Publication Data
US 2025/0293925 A1    Sep. 18, 2025

(51) Int. Cl.
*H04L 41/082*    (2022.01)
*H04L 41/0894*    (2022.01)
*H04W 24/02*    (2009.01)

(52) U.S. Cl.
CPC ........ *H04L 41/082* (2013.01); *H04L 41/0894* (2022.05); *H04W 24/02* (2013.01)

(58) Field of Classification Search
CPC ... H04L 41/082; H04L 41/0894; H04W 24/02
See application file for complete search history.

(56) References Cited

U.S. PATENT DOCUMENTS

| 2020/0019822 A1* | 1/2020 | Kothandaraman .. G06Q 10/067 |
| 2023/0308374 A1* | 9/2023 | Wang ..................... H04L 45/48 |
| 2025/0147856 A1* | 5/2025 | Zentz .................. G06F 11/3075 |

* cited by examiner

*Primary Examiner* — Tonia L Dollinger
*Assistant Examiner* — Joseph M Cousins (57) ABSTRACT

A device may receive key performance indicators (KPIs) associated with a network, and may rank a set of the KPIs associated with anomalous data to generate a list of ranked KPIs. The device may identify a worst performing KPI and a best performing KPI based on the list of ranked KPIs, and may join and filter the KPIs based on the worst performing KPI and the best performing KPI and to generate intermediate KPIs. The device may modify the intermediate KPIs based on customer experience prioritization data and to generate final KPIs, and may associate the final KPIs with automated network events to calculate a network change generated by the automated network events. The device may perform one or more actions based on the network change generated by the automated network events.

20 Claims, 10 Drawing Sheets

SYSTEMS AND METHODS FOR QUANTIFYING A NETWORK CHANGE GENERATED BY AUTOMATED NETWORK EVENTS

BACKGROUND

Networks, such as radio access networks (RANs), utilize thousands of parameters that must be configured in a certain manner in order to function correctly and in a manner that provides quality service to customers.

DETAILED DESCRIPTION OF EXAMPLE EMBODIMENTS

The following detailed description of example implementations refers to the accompanying drawings. The same reference numbers in different drawings may identify the same or similar elements.

A network may utilize automated network events to automatically manage network configurations. The automated network events may include automated parameter changes, automated parameter configurations, outputs of machine learning models, outputs of data analytics models, outputs of big data models, and/or the like. Network applications may implement thousands of parameter changes autonomously every day to network devices (e.g., eNodeBs, gNodeBs, and/or the like). Upgrades may be manually or automatically made to the network, parameters may be automatically or manually adjusted to improve network performance, and scripts for automatically adjusting parameters may be created. However, current network management systems fail to quantify an amount of time saved by automated network events and an amount of network changes (e.g., power consumption, resource consumption, time consumption, revenue savings, and/or the like) generated by automated network events. Thus, current techniques for managing automated network events consume computing resources (e.g., processing resources, memory resources, communication resources, and/or the like), networking resources, and/or other resources associated with utilizing automated network events that fail to generate operational cost savings, underutilizing automated network events that generate significant operational cost savings, failing to identify opportunities for further network automation enhancements, and/or the like.

Some implementations described herein provide a management system that quantifies a network change (e.g., power consumption, resource consumption, time consumption, revenue savings, and/or the like) generated by automated network events in a network. For example, the management system may receive key performance indicators (KPIs) associated with a network, and may rank a set of the KPIs associated with anomalous data to generate a list of ranked KPIs. The management system may identify a worst performing KPI and a best performing KPI based on the list of ranked KPIs, and may join and filter the KPIs based on the worst performing KPI and the best performing KPI and to generate intermediate KPIs. The management system may modify the intermediate KPIs based on customer experience prioritization data and to generate final KPIs, and may associate the final KPIs with automated network events to calculate a network change generated by the automated network events. The management system may perform one or more actions based on the network change generated by the automated network events.

In this way, the management system quantifies a network change generated by automated network events in a network. For example, the management system may intelligently quantify time saved by automated network events in a network and the subsequent network changes generated by the automated network events. The management system may receive and/or calculate KPIs derived from network analytics data and customer experience data, and may rank the KPIs to generate a list or ranked KPIs. The management system may associate monetary values with the list of ranked KPIs to quantify an impact of automated network events on the network change. The management system may enable network operators to realize operational cost efficiencies, uncover new savings opportunities, and make informed resource allocation decisions for automated network events. Thus, the management system may conserve computing resources, networking resources, and/or other resources that would have otherwise been consumed by utilizing automated network events that fail to generate operational cost savings, underutilizing automated network events that generate significant operational cost savings, failing to identify opportunities for further network automation enhancements, and/or the like.

FIGS. 1A-1G are diagrams of an example 100 associated with quantifying a network change generated by automated network events in a network. As shown in FIGS. 1A-1G, example 100 includes a data structure 105 associated with a network and an management system 110. The data structure 105 may include a database, a table, a list, and/or the like. The network may include one or more cells of a telecommunication network (e.g., a radio access network (RAN)). The management system 110 may include a system that quantifies a network change generated by automated network events in the network. Further details of the data structure 105, the network, and the management system 110 are provided elsewhere herein.

Figure 1A:
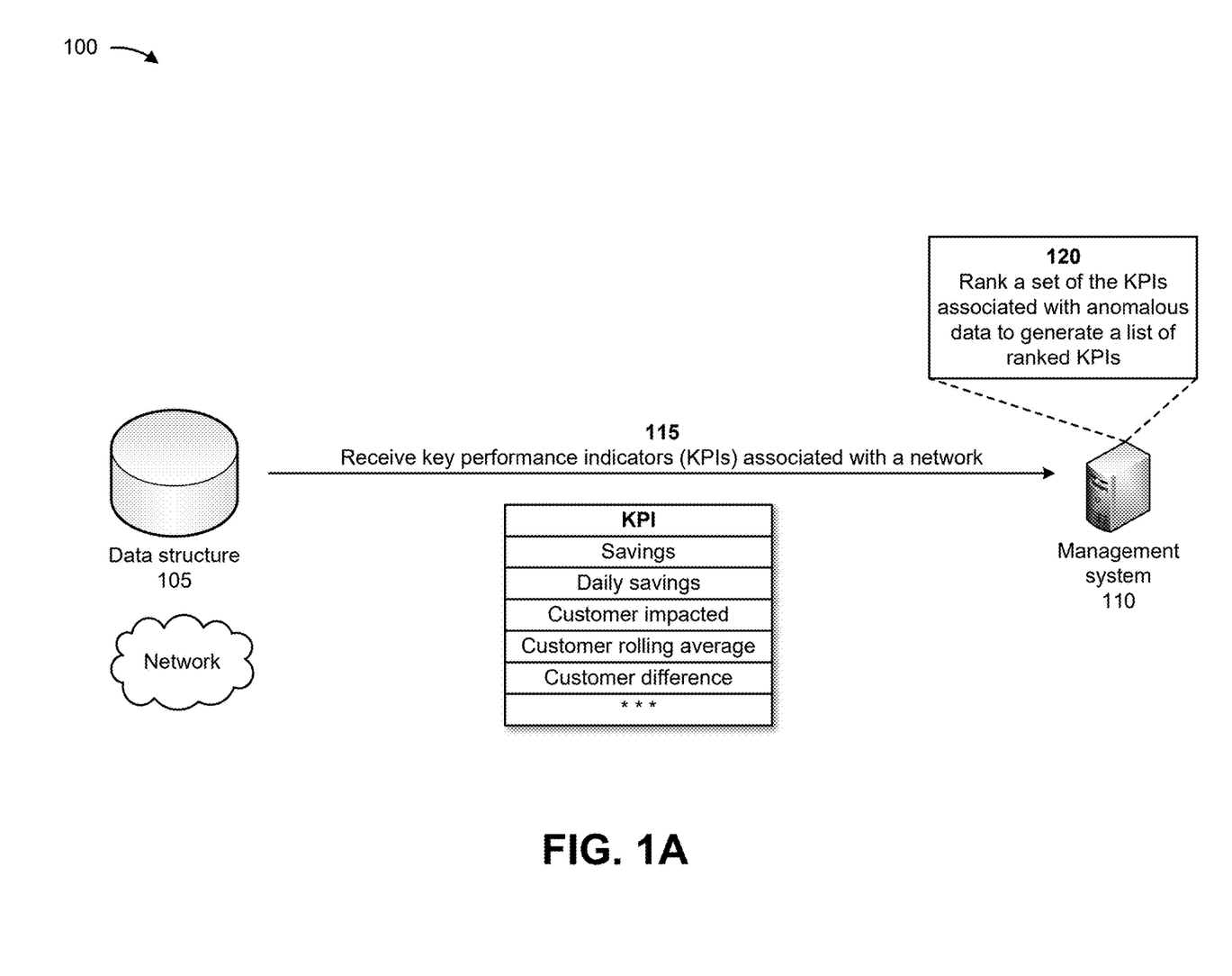
FIGS. 1A-1G are diagrams of an example associated with quantifying a network change generated by automated network events in a network.

As shown in FIG. 1A, and by reference number 115, the management system 110 may receive KPIs associated with a network. For example, the network may utilize thousands of parameters that must be configured in a certain manner in order to function correctly and in a manner that provides quality service to customers. The network may utilize automated network events to automatically manage the network. The automated network events may include automated parameter changes, automated parameter configurations, outputs of machine learning models, outputs of data analytics models, outputs of big data models, and/or the like. Network applications may implement the thousands of parameter changes autonomously (e.g., via the automated network events) every day to network devices (e.g., eNodeBs, gNodeBs, and/or the like). For example, the automated network events may cause upgrades to be automatically made to the network, may cause parameters to be automatically adjusted to improve network performance, and may cause scripts for automatically adjusting parameters to be created.

The network may generate KPIs associated with operation of the network, and may provide the KPIs to the data structure 105. The data structure 105 may store the KPIs. The KPIs may include a savings KPI (e.g., indicating monthly cell sector savings), a daily savings KPI (e.g., indicating daily cell sector savings), a customer impacted KPI (e.g., indicating daily customers impacted by cell sector), bandwidth KPIs, throughput KPIs, quality of service (QOS) KPIs, and/or the like. In some implementations, the management system 110 may derive additional KPIs from the KPIs, and may include the additional KPIs in the KPIs. The additional KPIs may include a customer rolling average KPI (e.g., indicating a seven data average by cell sector), a customer difference KPI (e.g., indicating a difference of the customer rolling average by cell sector), a customer impacted median KPI (e.g., indicating a monthly median of customers impacted by cell sector), a daily cost per customer KPI (e.g., indicated by dividing the savings KPI by the customer impacted median KPI), an annual cost per customer KPI (e.g., indicating an average daily cost per customer over an entire year by cell sector), a daily savings KPI (e.g., indicated by multiplying the annual cost per customer KPI and the customer difference KPI), a daily savings rolling average KPI (e.g., indicating a daily savings rolling seven day average by cell sector), a monthly savings KPI (e.g., indicating a sum of daily savings by month by cell sector), and/or the like.

The management system 110 may receive the KPIs associated with the network from the data structure 105. In some implementations, the management system 110 may continuously receive the KPIs from the data structure 105, may periodically receive the KPIs from the data structure 105, may receive the KPIs from the data structure 105 based on requesting the KPIs from the data structure 105, and/or the like.

As further shown in FIG. 1A, and by reference number 120, the management system 110 may rank a set of the KPIs associated with anomalous data to generate a list of ranked KPIs. For example, a set of the KPIs may be associated with anomalous data. The set of the KPIs associated with the anomalous data may include KPIs indicating a default bearer drop rate, a radio resource control (RRC) setup fail rate, a physical layer downlink throughput, a quality class identifier (QCI) evolved universal terrestrial radio access network (E-UTRAN) radio access bearer (ERAB) drop rate, a QCI ERAB setup fail rate, a QCI handover fail rate, and/or the like. The daily savings KPI may be generated per cell per day so only a single row of savings may be used per day. The management system 110 may rank the set of the KPIs associated with anomalous data (e.g., using a ranking matrix) to generate the list of ranked KPIs, which may enable additional savings data to be utilized per day.

Figure 1B:
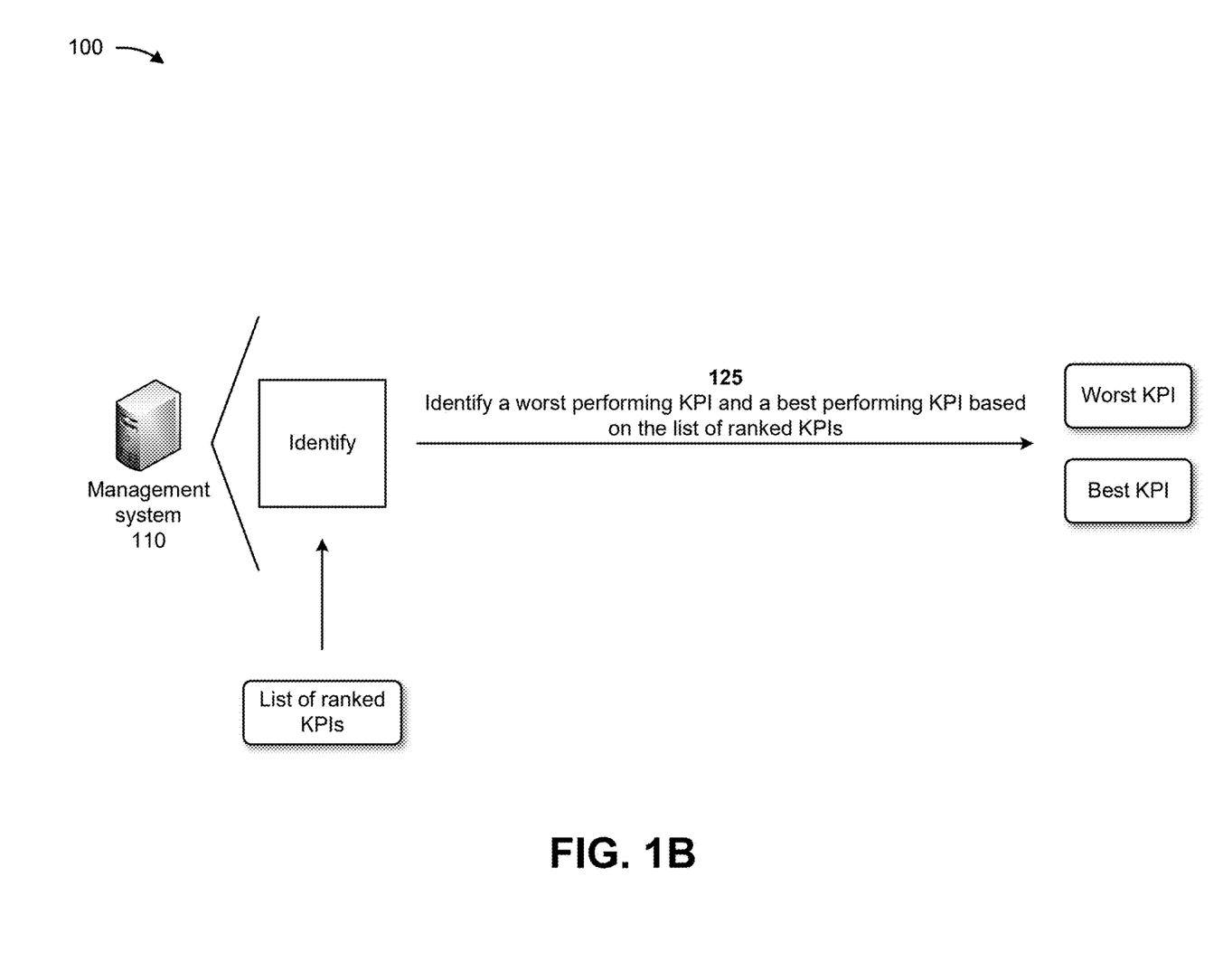

As shown in FIG. 1B, and by reference number 125, the management system 110 may identify a worst performing KPI and a best performing KPI based on the list of ranked KPIs. For example, the management system 110 may identify a last KPI in the list of ranked KPIs as the worst performing KPI (e.g., per cell per day) and may identify a first KPI in the list of ranked KPIs as the best performing KPI (e.g., per cell per day). In some implementations, the management system 110 may calculate a minimum KPI from the list of the ranked KPIs and may identify the minimum KPI as the worst performing KPI. In some implementations, the management system 110 may calculate a maximum KPI from the list of the ranked KPIs and may identify the maximum KPI as the best performing KPI. In some implementations, when identifying the worst performing KPI and the best performing KPI based on the list of ranked KPIs, the management system 110 may utilize customer experience prioritization data to identify the worst performing KPI and the best performing KPI (e.g., to resolve any ties associated with the rankings). The customer experience prioritization data may include data identifying economic, efficient, emotional, and empathetic customer experiences and how the customer experiences are prioritized (e.g., every customer interaction should offer value for money, be easy for the customer, generate positive feelings, and show customers you get them).

In some implementations, the management system 110 may execute an incremental savings detection process after utilizing the customer experience prioritization data to identify the worst performing KPI and the best performing KPI (e.g., to resolve any ties associated with the rankings). The incremental savings detection process may include determining raw historical contribution trends for every sector carrier (e.g., just raw contributions), and calculating a rolling three day average of contribution per day per sector carrier. The incremental savings detection process may also include calculating a day over day difference of the rolling three day average of contribution per day per sector carrier, and calculating a rise-over-run slope of the rolling three day average of contribution per day per sector carrier. The incremental savings detection process may include identifying and categorizing trends as a positive trend, a negative trend, or an insignificant trend, and calculating a daily incremental savings. The incremental savings detection process may include classifying final dispositions (e.g., persist, evaluate, roll back, and/or the like) for each network event. For example, if a network event provides a positive result (e.g., savings) and a positive trend, the final disposition may be to persist with the network event. If a network event provides a positive result and a negative trend, the final disposition may be to evaluate the network event. If a network event provides a negative result (e.g., no savings) and a positive trend, the final disposition may be to persist with the network event. If a network event provides a negative result and a negative trend, the final disposition may be to roll back the network event.

Figure 1C:
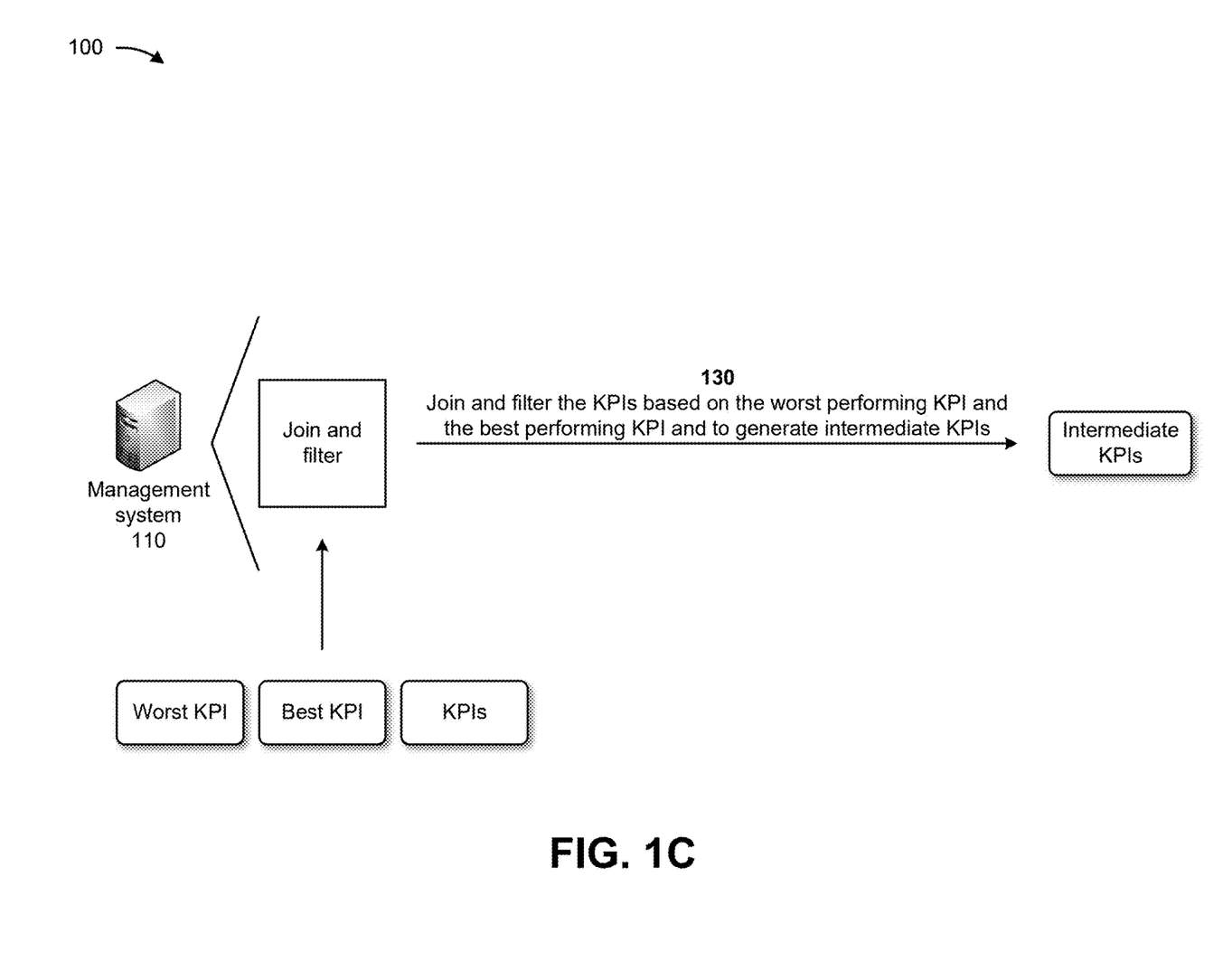

As shown in FIG. 1C, and by reference number 130, the management system 110 may join and filter the KPIs based on the worst performing KPI and the best performing KPI and to generate intermediate KPIs. For example, the management system 110 may join KPIs by associating KPIs that correlate with the worst performing KPI and by associating KPIs that correlate with the best performing KPI. In some implementations, the management system 110 may filter or remove the KPIs associated with the worst performing KPI and may utilize the KPIs associated with the best performing KPI. In some implementations, when filtering the KPIs based on the worst performing KPI and the best performing KPI and to generate the intermediate KPIs, the management system 110 may remove one or more of the KPIs based on the worst performing KPI and the best performing KPI and to generate the intermediate KPIs.

Figure 1D:
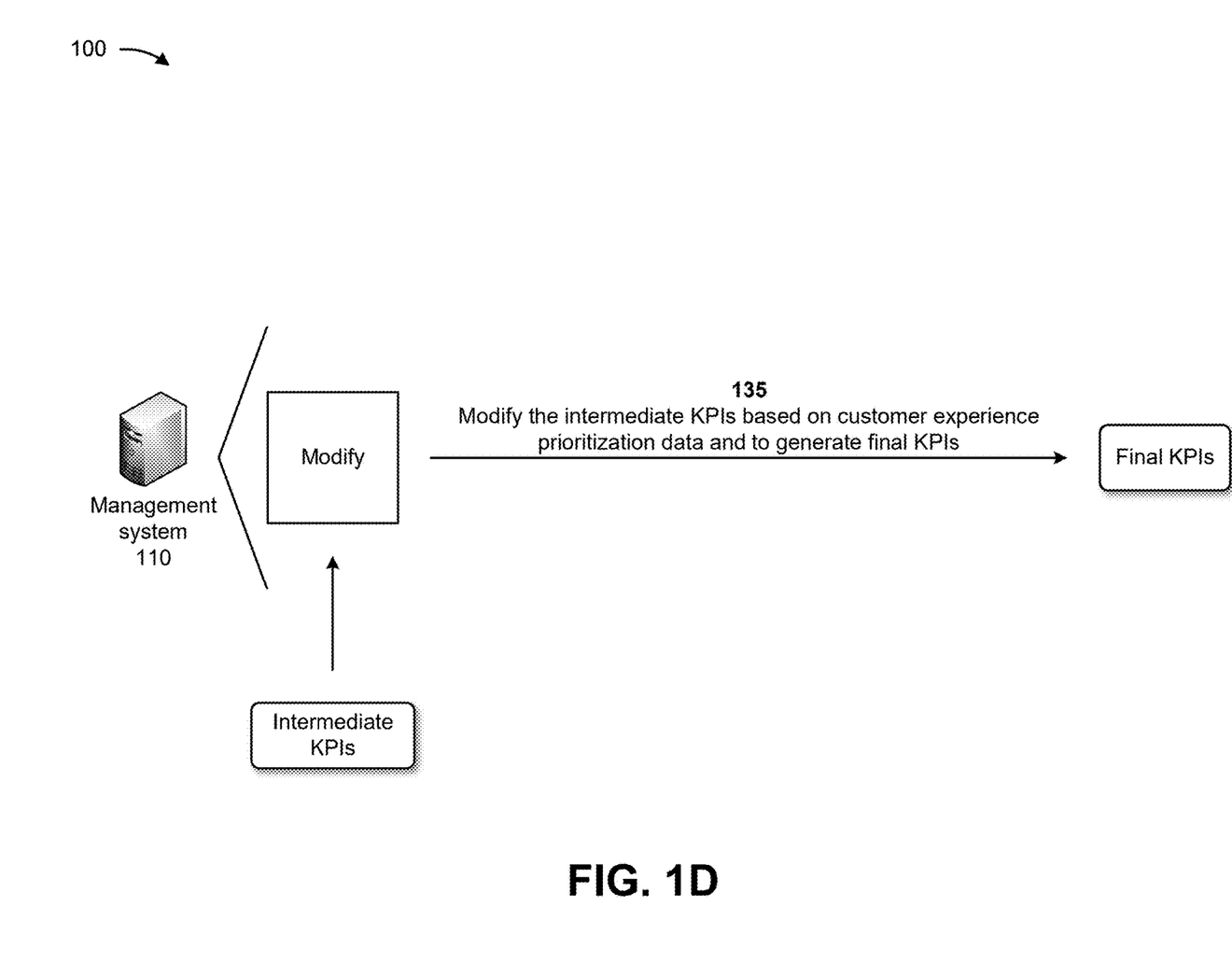

As shown in FIG. 1D, and by reference number 135, the management system 110 may modify the intermediate KPIs based on customer experience prioritization data and to generate final KPIs. For example, the management system 110 may identify and remove the lowest ranked set of the intermediate KPIs based on the customer experience prioritization data and to generate the final KPIs. In some implementations, when identifying and removing the lowest ranked set of the intermediate KPIs based on the customer experience prioritization data, the management system 110 may utilize the customer experience prioritization data to resolve any ties associated with the rankings of the intermediate KPIs.

Figure 1E:
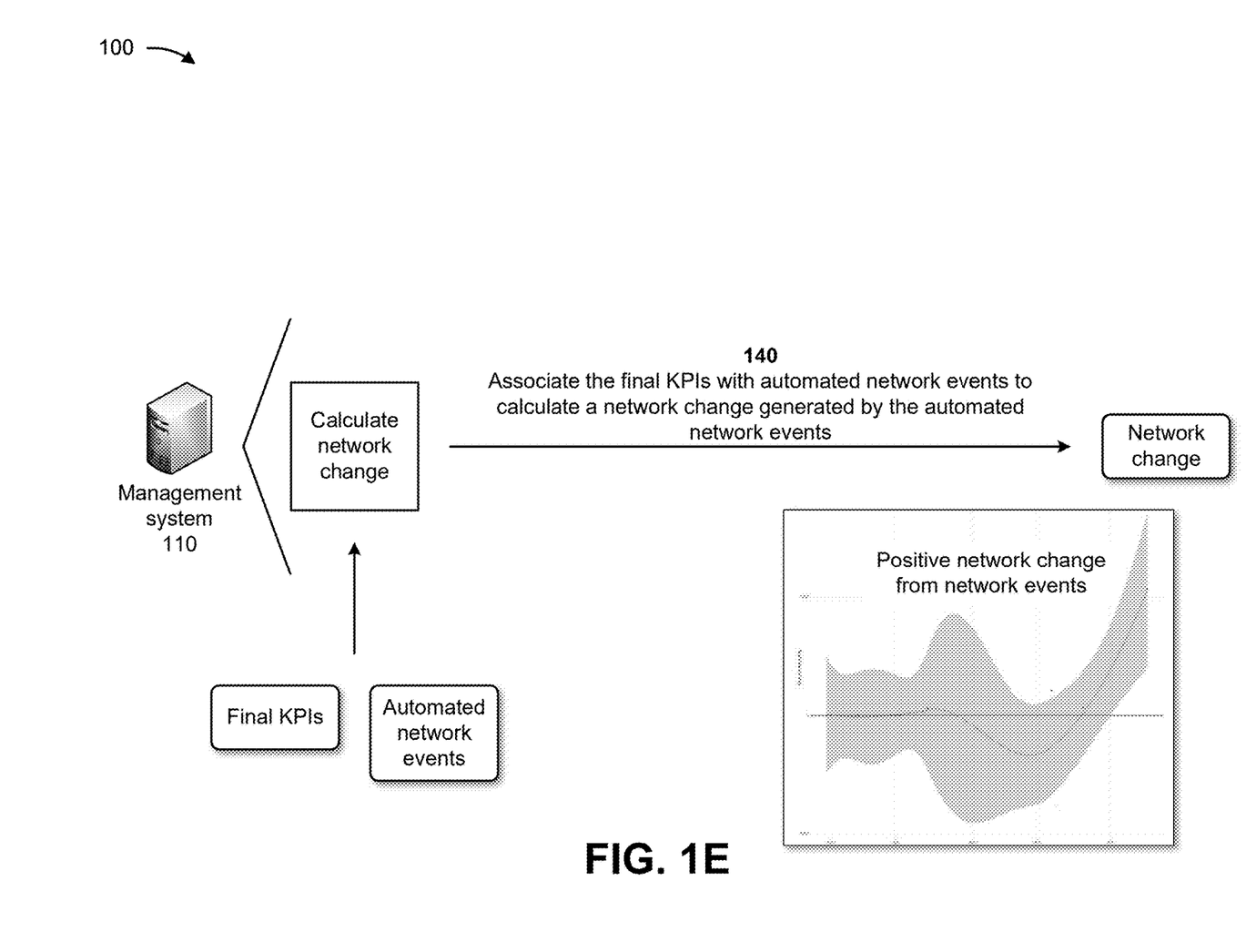

As shown in FIG. 1E, and by reference number 140, the management system 110 may associate the final KPIs with automated network events to calculate a network change generated by the automated network events. For example, the network may utilize the automated network events to automatically manage the network, which may generate the network change. The automated network events may include automated parameter changes, automated parameter configurations, outputs of machine learning models, outputs of data analytics models, outputs of big data models, and/or the like. The management system 110 may associate the final KPIs with the automated network events to calculate the network change generated by the automated network events. In some implementations, when associating the final KPIs with the automated network events to calculate the network change generated by the automated network events, the management system 110 may perform a net performance gain analysis on the final KPIs and the automated network events to calculate the network change (e.g., a net savings gain) generated by the automated network events. A net performance gain analysis may subtract savings losses from savings gains to calculate a net savings gain.

Figure 1F:
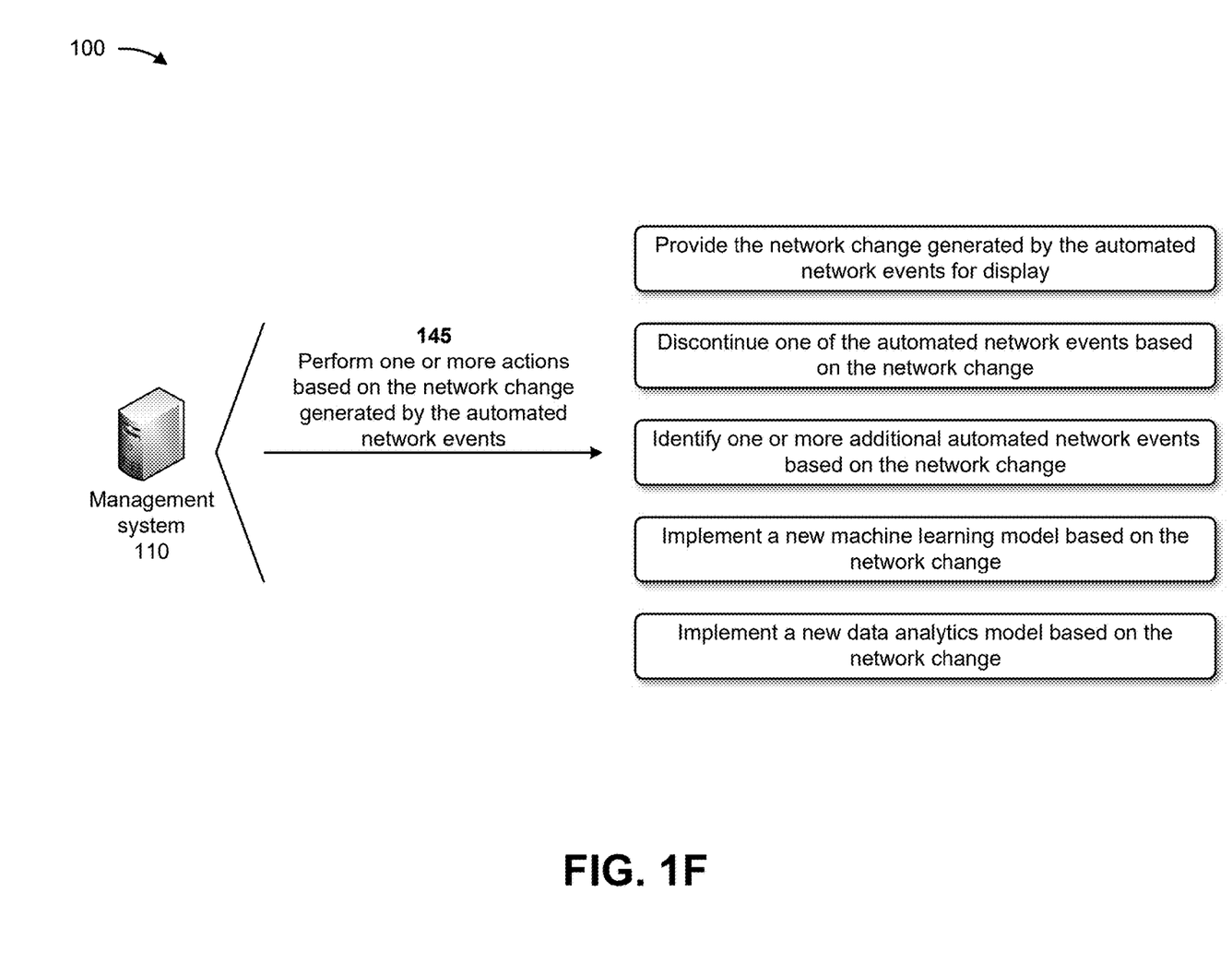

A shown in FIG. 1F, and by reference number 145, the management system 110 may perform one or more actions based on the network change generated by the automated network events. In some implementations, performing the one or more actions includes the management system 110 providing the network change generated by the automated network events for display. For example, the management system 110 may generate a report indicating the network change generated by the automated network events. The report may also highlight associated impacts on network performance. The management system 110 may provide the report for display to a user, such as a network engineer, a network manager, and/or the like. In this way, the management system 110 conserves computing resources, networking resources, and/or other resources that would have otherwise been consumed by utilizing automated network events that fail to generate operational cost savings.

In some implementations, performing the one or more actions includes the management system 110 discontinuing one of the automated network events based on the network change. For example, the management system 110 may identify an automated network event that fails to generate operational cost savings. The management system 110 may instruct a network system or a network engineer to discontinue use of the identified automated network event or to improve the identified automated network event. In this way, the management system 110 conserves computing resources, networking resources, and/or other resources that would have otherwise been consumed by utilizing automated network events that fail to generate operational cost savings.

In some implementations, performing the one or more actions includes the management system 110 identifying one or more additional automated network events based on the network change. For example, the management system 110 may determine that a particular automated network event is generating significant savings for a portion of the network. The management system 110 may determine that the particular automated network event should be implemented in a remaining portion of the network. In this way, the management system 110 conserves computing resources, networking resources, and/or other resources that would have otherwise been consumed by underutilizing automated network events that generate significant operational cost savings.

In some implementations, performing the one or more actions includes the management system 110 implementing a new machine learning model based on the network change. For example, the management system 110 may determine that a new machine learning model may be needed to manage new parameters to be implemented in the network. The management system 110 may cause the new machine learning model to be implemented with the network. In this way, the management system 110 conserves computing resources, networking resources, and/or other resources that would have otherwise been consumed by failing to identify opportunities for further network automation enhancements.

In some implementations, performing the one or more actions includes the management system 110 implementing a new data analytics model based on the network change. For example, the management system 110 may determine that a new data analytics model may be needed to manage new parameters to be implemented in the network. The management system 110 may cause the new data analytics model to be implemented with the network. In this way, the management system 110 conserves computing resources, networking resources, and/or other resources that would have otherwise been consumed by failing to identify opportunities for further network automation enhancements.

Figure 1G:
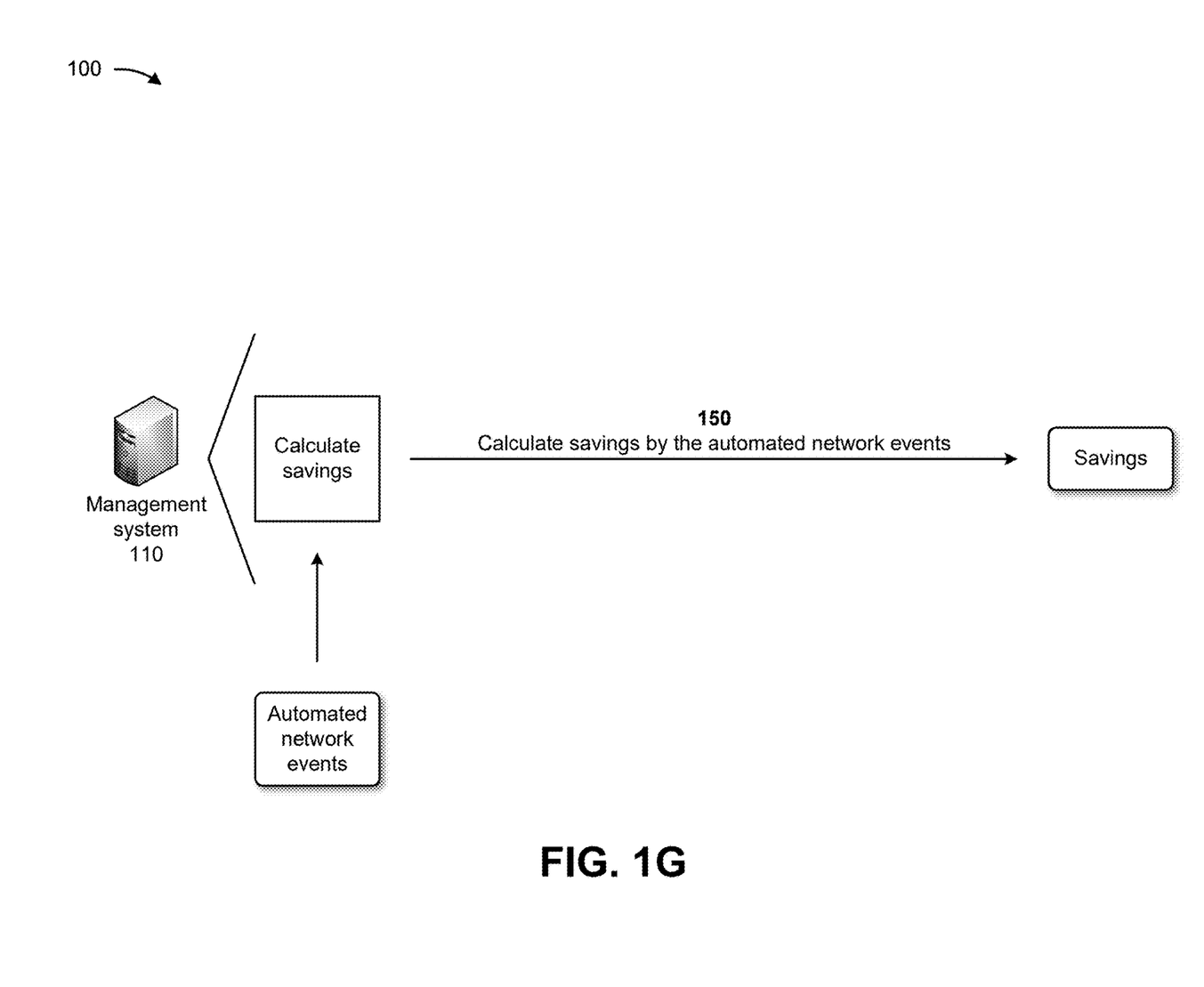

As shown in FIG. 1G, and by reference number 150, the management system 110 may calculate savings by the automated network events. For example, the management system 110 may perform the following for each of the automated network events. The management system 110 may calculate an annual workflow cost for each task if manually performed, and may calculate an annual cost of implementing each task with an automated network event. The management system 110 may determine a difference between the manual annual workflow cost and the automated network event annual cost. The management system 110 may divide the difference by the automated network event annual cost to calculate a return on investment for each automated network event (e.g., savings by each automated network event). In some implementations, the management system 110 may generate a report identifying the savings by the automated network events and may provide the report for display to a network operator, a network engineer, a business executive, and/or the like.

In this way, the management system 110 quantifies a network change generated by automated network events in a network. For example, the management system 110 may intelligently quantify time saved by automated network events in a network and the subsequent network change generated by the automated network events. The management system 110 may receive and/or calculate KPIs derived from network analytics data and customer experience data, and may rank the KPIs to generate a list or ranked KPIs. The management system 110 may associate monetary values with the list of ranked KPIs to quantify an impact of automated network events on the network change. The management system 110 may enable network operators to realize operational cost efficiencies, uncover new savings opportunities, and make informed resource allocation decisions for automated network events. Thus, the management system 110 may conserve computing resources, networking resources, and/or other resources that would have otherwise been consumed by utilizing automated network events that fail to generate operational cost savings, underutilizing automated network events that generate significant operational cost savings, failing to identify opportunities for further network automation enhancements, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
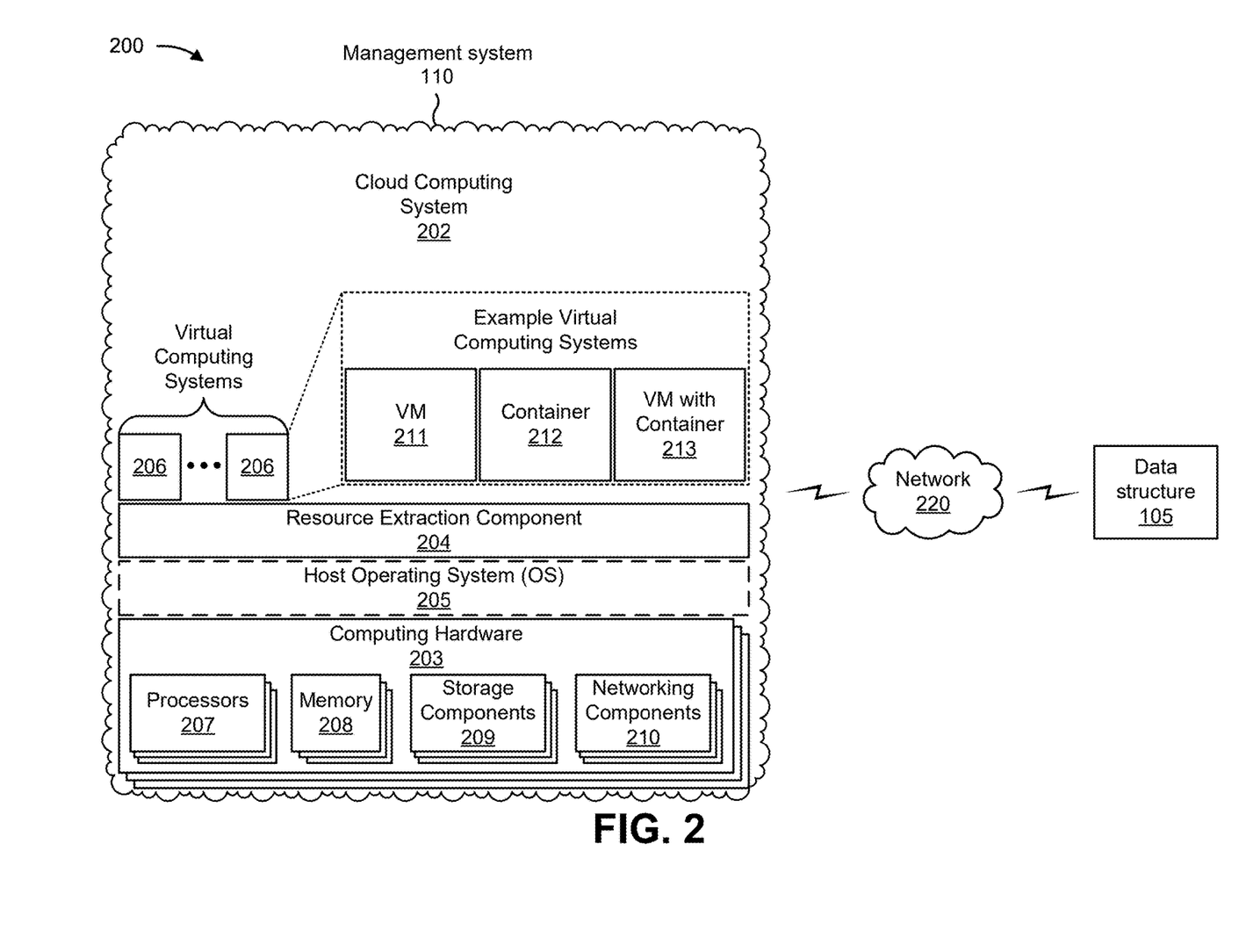
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the management system 110, which may include one or more elements of and/or may execute within a cloud computing system 202. The cloud computing system 202 may include one or more elements 203-213, as described in more detail below. As further shown in FIG. 2, the environment 200 may include the data structure 105 and/or a network 220. Devices and/or elements of the environment 200 may interconnect via wired connections and/or wireless connections.

The data structure 105 may include one or more devices capable of receiving, generating, storing, processing, and/or providing information, as described elsewhere herein. The data structure 105 may include a communication device and/or a computing device. For example, the data structure 105 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 105 may communicate with one or more other devices of the environment 200, as described elsewhere herein.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the management system 110 may include one or more elements 203-213 of the cloud computing system 202, may execute within the cloud computing system 202, and/or may be hosted within the cloud computing system 202, in some implementations, the management system 110 may not be cloud-based (e.g., may be implemented outside of a cloud computing system) or may be partially cloud-based. For example, the management system 110 may include one or more devices that are not part of the cloud computing system 202, such as the device 300 of FIG. 3, which may include a standalone server or another type of computing device. The management system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
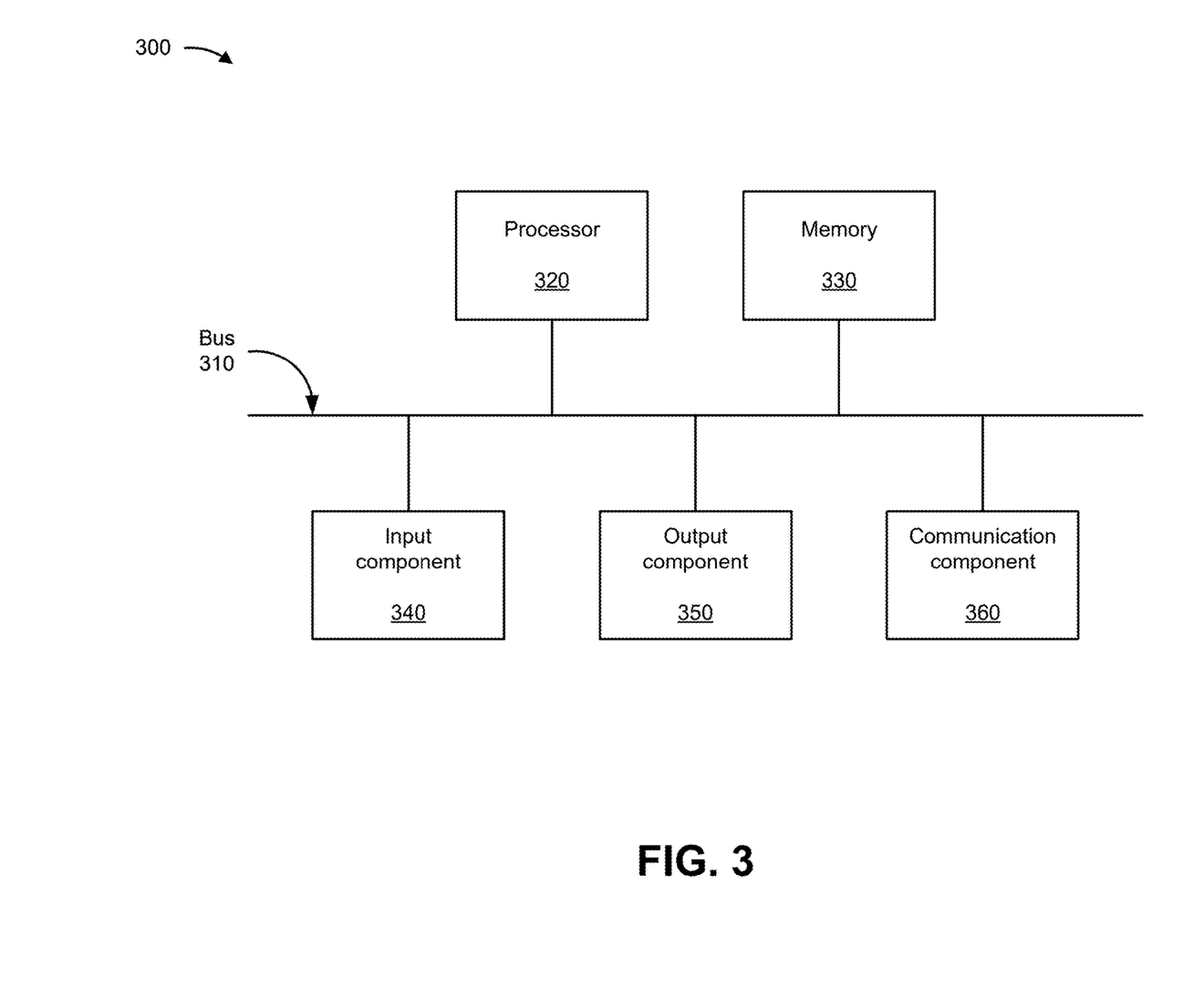
FIG. 3 is a diagram of example components of one or more devices of FIG. 2.

FIG. 3 is a diagram of example components of a device 300, which may correspond to the management system 110. In some implementations, the management system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
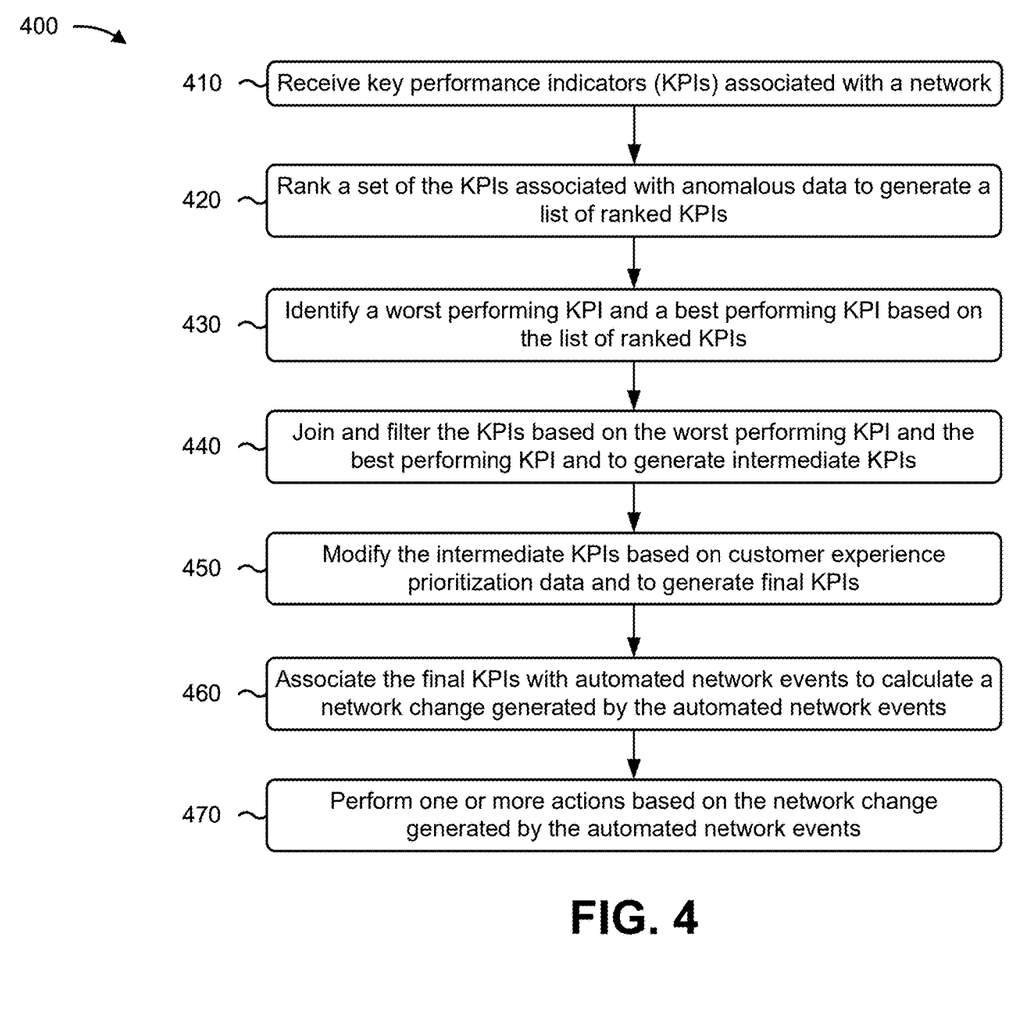
FIG. 4 is a flowchart of an example process for quantifying a network change generated by automated network events in a network.

FIG. 4 is a flowchart of an example process 400 for quantifying a network change generated by automated network events in a network. In some implementations, one or more process blocks of FIG. 4 may be performed by a device (e.g., the management system 110). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving KPIs associated with a network (block 410). For example, the device may receive KPIs associated with a network, as described above.

As further shown in FIG. 4, process 400 may include ranking a set of the KPIs associated with anomalous data to generate a list of ranked KPIs (block 420). For example, the device may rank a set of the KPIs associated with anomalous data to generate a list of ranked KPIs, as described above. In some implementations, the set of the KPIs associated with the anomalous data include KPIs indicating a default bearer drop rate, a radio resource control setup fail rate, a physical layer downlink throughput, a QCI radio access bearer drop rate, a QCI radio access bearer setup fail rate, and a QCI handover fail rate.

As further shown in FIG. 4, process 400 may include identifying a worst performing KPI and a best performing KPI based on the list of ranked KPIs (block 430). For example, the device may identify a worst performing KPI and a best performing KPI based on the list of ranked KPIs, as described above. In some implementations, identifying the worst performing KPI and the best performing KPI based on the list of ranked KPIs includes utilizing the customer experience prioritization data to identify the worst performing KPI and the best performing KPI.

As further shown in FIG. 4, process 400 may include joining and filtering the KPIs based on the worst performing KPI and the best performing KPI and to generate intermediate KPIs (block 440). For example, the device may join and filtering the KPIs based on the worst performing KPI and the best performing KPI and to generate intermediate KPIs, as described above. In some implementations, filtering the KPIs based on the worst performing KPI and the best performing KPI and to generate the intermediate KPIs includes removing one or more of the KPIs based on the worst performing KPI and the best performing KPI and to generate the intermediate KPIs.

As further shown in FIG. 4, process 400 may include modifying the intermediate KPIs based on customer experience prioritization data and to generate final KPIs (block 450). For example, the device may modify the intermediate KPIs based on customer experience prioritization data and to generate final KPIs, as described above.

As further shown in FIG. 4, process 400 may include associating the final KPIs with automated network events to calculate a network change generated by the automated network events (block 460). For example, the device may associate the final KPIs with automated network events to calculate a network change generated by the automated network events, as described above. In some implementations, associating the final KPIs with the automated network events to calculate the network change generated by the automated network events includes performing a net performance gain analysis on the final KPIs and the automated network events to calculate the network change generated by the automated network events.

In some implementations, the automated network events include one or more of an automated parameter change, an automated parameter configuration, an output of a machine learning model, an outputs of a data analytics model, or an output of a big data model.

As further shown in FIG. 4, process 400 may include performing one or more actions based on the network change generated by the automated network events (block 470). For example, the device may perform one or more actions based on the network change generated by the automated network events, as described above. In some implementations, performing the one or more actions includes one or more of prioritizing the automated network events based on the network change, or determining a customer experience improvement based on the network change. In some implementations, performing the one or more actions includes one or more of providing the network change generated by the automated network events for display, or discontinuing one of the automated network events based on the network change. In some implementations, performing the one or more actions includes one or more of identifying one or more additional automated network events based on the network change, or implementing a new machine learning model based on the network change. In some implementations, performing the one or more actions includes one or more of implementing a new data analytics model based on the network change, or generating a report indicating the network change generated by the automated network events.

In some implementations, process 400 includes calculating savings by the automated network events. In some implementations, process 400 includes deriving additional KPIs from the KPIs, and including the additional KPIs in the KPIs prior to ranking the set of the KPIs. In some implementations, process 400 includes associating the final KPIs with automated network events to calculate operating cost savings generated by the automated network events.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, key performance indicators (KPIs) associated with a network;
ranking, by the device, a set of the KPIs associated with anomalous data to generate a list of ranked KPIs;
identifying, by the device, a worst performing KPI and a best performing KPI based on the list of ranked KPIs;
joining and filtering, by the device, the KPIs based on the worst performing KPI and the best performing KPI and to generate intermediate KPIs;
modifying, by the device, the intermediate KPIs based on customer experience prioritization data and to generate final KPIs;
associating, by the device, the final KPIs with automated network events to calculate a network change generated by the automated network events; and
performing, by the device, one or more actions based on the network change generated by the automated network events.

2. The method of claim 1, further comprising:
calculating savings by the automated network events.

3. The method of claim 1, further comprising:
deriving additional KPIs from the KPIs; and
including the additional KPIs in the KPIs prior to ranking the set of the KPIs.

4. The method of claim 1, wherein the set of the KPIs associated with the anomalous data include KPIs indicating a default bearer drop rate, a radio resource control setup fail rate, a physical layer downlink throughput, a quality class identifier (QCI) radio access bearer drop rate, a QCI radio access bearer setup fail rate, and a QCI handover fail rate.

5. The method of claim 1, wherein identifying the worst performing KPI and the best performing KPI based on the list of ranked KPIs comprises:
utilizing the customer experience prioritization data to identify the worst performing KPI and the best performing KPI.

6. The method of claim 1, wherein filtering the KPIs based on the worst performing KPI and the best performing KPI and to generate the intermediate KPIs comprises:
removing one or more of the KPIs based on the worst performing KPI and the best performing KPI and to generate the intermediate KPIs.

7. The method of claim 1, wherein associating the final KPIs with the automated network events to calculate the network change generated by the automated network events comprises:
performing a net performance gain analysis on the final KPIs and the automated network events to calculate the network change generated by the automated network events.

8. A device, comprising:
one or more processors configured to:
receive key performance indicators (KPIs) associated with a network;
derive additional KPIs from the KPIs;
include the additional KPIs in the KPIs;
rank a set of the KPIs associated with anomalous data to generate a list of ranked KPIs;
identify a worst performing KPI and a best performing KPI based on the list of ranked KPIs;
join and filter the KPIs based on the worst performing KPI and the best performing KPI and to generate intermediate KPIs;
modify the intermediate KPIs based on customer experience prioritization data and to generate final KPIs;
associate the final KPIs with automated network events to calculate a network change generated by the automated network events; and
perform one or more actions based on the network change generated by the automated network events.

9. The device of claim 8, wherein the automated network events include one or more of:
an automated parameter change,
an automated parameter configuration,
an output of a machine learning model,
an outputs of a data analytics model, or
an output of a big data model.

10. The device of claim 8, wherein the one or more processors, to perform the one or more actions, are configured to one or more of:
prioritize the automated network events based on the network change; or
determine a customer experience improvement based on the network change.

11. The device of claim 8, wherein the one or more processors, to perform the one or more actions, are configured to one or more of:
provide the network change generated by the automated network events for display; or
discontinue one of the automated network events based on the network change.

12. The device of claim 8, wherein the one or more processors, to perform the one or more actions, are configured to one or more of:
identify one or more additional automated network events based on the network change; or
implement a new machine learning model based on the network change.

13. The device of claim 8, wherein the one or more processors, to perform the one or more actions, are configured to one or more of:
implement a new data analytics model based on the network change; or
generate a report indicating the network change generated by the automated network events.

14. The device of claim 8, wherein the one or more processors are further configured to:
associate the final KPIs with automated network events to calculate operating cost savings generated by the automated network events.

15. A non-transitory computer-readable medium storing a set of instructions, the set of instructions comprising:
one or more instructions that, when executed by one or more processors of a device, cause the device to:
receive key performance indicators (KPIs) associated with a network;
rank a set of the KPIs associated with anomalous data to generate a list of ranked KPIs;
identify a worst performing KPI and a best performing KPI based on the list of ranked KPIs;
join and filtering the KPIs based on the worst performing KPI and the best performing KPI and to generate intermediate KPIs;
modify the intermediate KPIs based on customer experience prioritization data and to generate final KPIs;

associate the final KPIs with automated network events to calculate a network change and operating cost savings generated by the automated network events; and perform one or more actions based on the network change generated by the automated network events.

16. The non-transitory computer-readable medium of claim 15, wherein the one or more instructions further cause the device to:

calculate savings by the automated network events.

17. The non-transitory computer-readable medium of claim 15, wherein the one or more instructions, that cause the device to identify the worst performing KPI and the best performing KPI based on the list of ranked KPIs, cause the device to:

utilize the customer experience prioritization data to identify the worst performing KPI and the best performing KPI.

18. The non-transitory computer-readable medium of claim 15, wherein the one or more instructions, that cause the device to filter the KPIs based on the worst performing KPI and the best performing KPI and to generate the intermediate KPIs, cause the device to:

remove one or more of the KPIs based on the worst performing KPI and the best performing KPI and to generate the intermediate KPIs.

19. The non-transitory computer-readable medium of claim 15, wherein the one or more instructions, that cause the device to associate, by the device, the final KPIs with the automated network events to calculate the network change and the operating cost savings generated by the automated network events, cause the device to:

perform a net performance gain analysis on the final KPIs and the automated network events to calculate the network change and the operating cost savings generated by the automated network events.

20. The non-transitory computer-readable medium of claim 15, wherein the one or more instructions, that cause the device to perform the one or more actions, cause the device to one or more of:

prioritize the automated network events based on the network change;

determine a customer experience improvement based on the network change;

provide the network change generated by the automated network events for display;

discontinue one of the automated network events based on the network change;

identify one or more additional automated network events based on the network change;

implement a new machine learning model based on the network change;

implement a new data analytics model based on the network change; or generate a report indicating the network change generated by the automated network events.

* * * * *